United States Patent Office 3,450,741
Patented June 17, 1969

3,450,741
PRODUCTION OF ω-HYDROXY-
ALKANCARBONITRILES
Friedrich Becke, Heidelberg, and Helmuth Hagen, Ludwigshafen (Rhine), Germany, assignors to Badische Anilin- & Soda Fabrik Aktiengesellschaft, Ludwigshafen (Rhine), Germany
No Drawing. Filed Nov. 8, 1966, Ser. No. 592,709
Claims priority, application Germany, Nov. 17, 1965,
B 84,534
Int. Cl. C07c *121/12, 121/10, 121/02*
U.S. Cl. 260—465.2                                4 Claims

ABSTRACT OF THE DISCLOSURE

Process for the production of a nitrile of a hydroxyalkane mono-carboxylic acid or a hydroxyalkene mono-carboxylic acid, the hydroxy group being separated from the nitrile group by at least 6 carbon atoms, by heating the corresponding hydroxyalkane mono-carboxylic acid or hydroxyalkene mono-carboxylic acid of 7 to 20 carbon atoms or their —COO·NH$_4$ ammonium salts or —CONH$_2$ amides in the presence of at least 2 moles of ammonia per mole of the carboxylic acid or at least one mole of ammonia per mole of said ammonium salt or amide to a temperature of from 250° to 400° C., preferably in a medium which is essentially free of dehydration catalysts and at a pressure of from 50 to 150 atmospheres.

---

This invention relates to the production of ω-hydroxyalkane-carbonitriles from the corresponding ω-hydroxyalkanoic acids.

It is known from U.S. Patent 3,121,733 that by reacting lactones of the formula

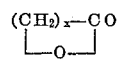

where x is an integer from 3 to 7 with ammonia in the presence of acid dehydration catalysts at 200° to 450° C. ω-hydroxycarbonitriles are obtained in addition to ω-olefinically unsaturated alkanecarbonitriles. It is furthermore known from Belgian Patent 661,606 that a mixture of different nitriles, including ω-hydroxycapronitrile, is obtained by reacting byproducts from oxidation operations such as are produced by oxidizing cyclohexane with gases containing molecular oxygen, some of these byproducts containing ε-caprolactone in polymeric form, at 200° to 550° C. in the presence of ammonia over acid catalysts. It is also known that unsaturated nitriles are mainly obtained in the conventional synthesis of nitriles from carboxylic acids in the presence of catalysts when using hydroxycarboxylic acids (cf. Houben-Weyl, "Methoden der Organischen Chemie," 4th edition, vol. 8, p. 337).

It is an object of the present invention to provide a simple process for the production of ω-hydroxyalkanecarbonitriles from the corresponding acids. Another object of the invention is to provide a process which gives high yields of the said nitriles. These and other objects of the invention will be better understood from the following detailed description.

We have found that hydroxyalkanecarbonitriles and hydroxyalkenecarbonitriles whose hydroxy groups are separated from the nitrile groups by at least 6, especially more than 8, carbon atoms may be prepared from the corresponding hydroxyalkanecarboxylic or hydroxyalkenecarboxylic acids or from the ammonium salts or amides of the said acids in the presence of at least two moles of ammonia per mole of hydroxyalkanecarboxylic acid or at least one mole of ammonia per mole of ammonium salt or amide of the said acids at elevated temperature in a simple manner by heating the hydroxyalkanecarboxylic or hydroxyalkenecarboxylic acids, the ammonium salts or amides of the said acids and the ammonia, if desired after adding water or steam, to the reaction temperature in the absence of dehydration catalysts.

It is surprising that nitriles should be formed in the absence of dehydration catalysts even though water is added.

Examples of suitable starting materials are:
7-hydroxyenanthic acid
7-hydoxycaprylic acid
8-hydroxycaprylic acid
9-hydroxypelargic acid
7-hydroxy-3-methylcaprylic acid
10-hydroxycapric acid
11-hydroxyundecanoic acid
12-hydroxydodecanoic acid
13-hydroxytridecanoic acid
14-hydroxymyristic acid
15-hydroxyhexadecanoic acid (juniperic acid)
9-hydroxy-14-methylpalmitic acid
9-hydroxystearic acid
10-hydroxystearic acid
12-hydroxystearic acid
7-hydroxy-2-methyl-4-heptenoic acid
9-hydroxy-6-(or 5)-nonenoic acid
8-hydroxy-3,7-dimethyl-6-octenoic acid
16-hydroxy-5-hexadecenoic acid (Δ$^5$-isoambrettolic acid)
10-hydroxyelaidic acid
12-hydroxy-9-octadecenoic acid (ricinoleic acid), as well as the amides or ammonium salts of the said acids.

The acids contain at least seven carbon atoms, but as a rule not more than twenty carbon atoms.

It may be advantageous to first convert the acids into the corresponding ammonium salt or amide. Ammonia is preferably used in an amount of 10 to 30 moles per mole of hydroxyalkanecarboxylic acid or the ammonium salt or amide thereof. Water or steam may be added separately, in the form of aqueous solutions of the starting materials or in the form of aqueous ammonia solutions. The amount of water or steam in the reaction mixture (not including the water eliminated during the reaction) may be 0 to 60% by weight based on the starting material. The reaction temperature is between 250° to 400° C. The reaction may for example be carried out by heating the reactants together to the reaction temperature in a closed vessel. The pressure set up in the process depends primarily on the amount of ammonia used. It is usually between 50 and 150 atmospheres. The process is preferably carried out continuously, e.g. in a pressure-resistant tube. The reaction products are obtained by removing the excess ammonia from the reaction mixture and separating the mixture into its components, e.g. by distillation. The hydroxyalkanecarbonitriles may for example be catalytically reduced to the corresponding alkanolamines which can be used for the production of mixed polyester polyamides or made into emulsifiers by ethanoxylation.

Example 1

100 ml./h. of aqueous 7-hydroxyenanthic acid containing 25% by weight of water and 250 ml./h. of liquid ammonia are continuously supplied to a pressure-resistant stainless-steel tube 1 m. long and 30 mm. in diameter which has a smooth surface and is electrically heated at 300° C. A pressure of approx. 100 atmospheres is set up in the tube during the reaction. The reaction mixture is released from pressure on leaving the reaction tube, thus being substantially freed from ammonia, dehydrated and then distilled under subatmospheric pressure. The hydroxyenanthonitrile which distills at 112° to 116° C./1 mm. is obtained in a yield of 70%.

EXAMPLE 2

10 kg. of ricinoleic acid containing 3% of water is reacted with ammonia by a trickling method in a tubular reactor 1 m. long at 300° C. and a pressure of 80 atmospheres as follows:

100 ml. of ricinoleic acid and 250 ml. of liquid ammonia are pumped in per hour. The reaction product is freed from dissolved ammonia and water and distilled at 1 mm. The fraction distilling between 195° and 205° C. consists of ricinoleic nitrile as shown by elementary analysis and infrared spectroscopy. The double bond is present mainly in trans configuration. The yield is 50% of the theory based on ricinoleic acid. In addition, there are formed 35% by weight, based on ricinoleic acid used, of lower-boiling cracked products, only approx. 10% by weight, based on ricinoleic acid used, remaining behind as non-distillable residue.

EXAMPLE 3

Ricinoleic acid containing 10% of water is reacted as described in Example 2. Ricinoleic nitrile is then obtained in a yield of 59% of the theory based on ricinoleic acid, lower-boiling cracked products are obtained in an amount of approximately 20% based on ricinoleic acid and the non-distillable residue constitutes more than 10% of the ricinoleic acid used.

We claim:

1. A process for the production of the nitrile of a carboxylic acid selected from the group consisting of hydroxyalkane and hydroxyalkene mono-carboxylic acids of 7 to 20 carbon atoms, the hydroxy group being separated by at least 6 carbon atoms from the nitrile group, said process comprising: heating to a temperature of about 250° C. to 400° C. and at a pressure of about 50 to 150 atmospheres at least one compound selected from the group consisting of the corresponding hydroxyalkane and hydroxyalkene mono-carboxylic acids and their —COO·NH$_4$ ammonium salts and —CONH$_2$ amides for reaction with ammonia, there being present at least 2 moles of ammonia per mole of carboxylic acid with at least 1 mole of ammonia per mole of the corresponding ammonium salt or amide, said process being carried out in the absence of dehydration catalysts.

2. A process as claimed in claim 1 wherein the reaction is carried out with the simultaneous addition of water in liquid or vaporous form.

3. A process as claimed in claim 2 in which water is added in an amount up to 60 % by weight with reference to the carboxylic acid reactant.

4. A process as claimed in claim 1 wherein the reaction is carried out with ammonia in an amount of about 10 to 30 moles per mole of the carboxylic acid deactant.

References Cited

UNITED STATES PATENTS 3,043,860   7/1962   Phillips et al. _____ 260—465.2

JOSEPH P. BRUST, *Primary Examiner.*

U.S. Cl. X.R.

260—465.6